United States Patent
Querzé et al.

(10) Patent No.: US 10,981,121 B2
(45) Date of Patent: Apr. 20, 2021

(54) MACROPOROUS POLYVINYLIDENE FLUORIDE (PVDF) MEMBRANES

(71) Applicant: GVS S.p.A., Zola Predosa (IT)

(72) Inventors: Luca Querzé, San Lazzaro di Savena (IT); Soccorso Felice Antonio Gaeta, Monte San Pietro (IT); Marta Ewa Bojarska, Warsaw (PL); Clemens Alexowsky, Gelsenkirchen (DE); Mathias Ulbricht, Essen (DE)

(73) Assignee: GVS S.p.A., Zola Predosa (IT)

( * ) Notice: Subject to any disclaimer, the term of this patent is extended or adjusted under 35 U.S.C. 154(b) by 51 days.

(21) Appl. No.: 16/286,044

(22) Filed: Feb. 26, 2019

(65) Prior Publication Data
US 2019/0262777 A1    Aug. 29, 2019

(30) Foreign Application Priority Data
Feb. 26, 2018  (IT) .................... 102018000003038

(51) Int. Cl.
| B01D 67/00 | (2006.01) |
| B01D 61/14 | (2006.01) |
| B01D 69/02 | (2006.01) |
| B01D 71/34 | (2006.01) |
| B01D 69/06 | (2006.01) |

(52) U.S. Cl.
CPC ....... *B01D 67/0013* (2013.01); *B01D 61/145* (2013.01); *B01D 67/0009* (2013.01); *B01D 67/0011* (2013.01); *B01D 67/0016* (2013.01); *B01D 67/0095* (2013.01); *B01D 69/02* (2013.01); *B01D 71/34* (2013.01); *B01D 69/06* (2013.01); *B01D 2323/22* (2013.01); *B01D 2325/20* (2013.01); *B01D 2325/38* (2013.01)

(58) Field of Classification Search
CPC ............ B01D 67/0013; B01D 67/0016; B01D 67/0018; B01D 71/34
See application file for complete search history.

(56) References Cited

U.S. PATENT DOCUMENTS 5,834,107 A * 11/1998 Wang .................... B01D 39/083
                                                                  428/310.5
2017/0312703 A1   11/2017 Huang et al.

FOREIGN PATENT DOCUMENTS

| CN | 106731897 A | 5/2017 |
| EP | 1839730 A1 | 10/2007 |
| KR | 2016 0131654 A | 11/2016 |

OTHER PUBLICATIONS

Li et al, Controlling the microstructure of PVdF thin films for microelectronics, Journal of MateriL Chemistry C, 2013, 1, 7695.*
Reber R., American Filtration and Separations Society Fall Conference 2015, AFS 2015: Advanced Technologies in Filter Media, "S2.2.1 polyvinylidene difluoride (PVDF) non-solvent induced phase separation ultrafiltration hollow fiber membranes using dimethyl sulfoxide Evol (DMSO evol®)", Abstract, 1 pg.
Z. Cui et al., Progress in Polymer Science 39 (2014), "Recent progreass in fluoropolymers for membranes", pp. 164-198.

(Continued)

*Primary Examiner* — Krishnan S Menon
(74) *Attorney, Agent, or Firm* — Dickinson Wright PLLC

(57) ABSTRACT

The invention relates to macroporous, hydrophobic and isotropic polyvinylidene fluoride (PVDF) membranes having improved properties and to a new method for preparing the same.

9 Claims, 2 Drawing Sheets

(56) References Cited

OTHER PUBLICATIONS

A. Figoli et al., Green Chemistry, 2014, 16, "Towards non-toxic solvents for membrane preparation: a review", pp. 4034-4059.
A. Bottino et al., "The formation of microporous polyvinylidene difluoride membranes by phase separation", Journal of Membrane Science, 57 (1991), pp. 1-20.
D. Lin et al., European Polymer Journal 42 (2006), "Preparation and characterization of microporous PVDF/PMMA composite membranes by phase inversion in water/DMSO solutions", pp. 2407-2418.
Q. Wang et al., Desalination 297 (2012), "Effects of solvent compositions on physicochemical properties and anti-fouling ability of PVDF microfiltration membranes for wastewater treatment", pp. 79-86.
F. Liu et al., Journal of Membrane Science 375 (2011), "Progress in the production and modification of PVDF membranes", pp. 1-27.
C. Kuo, et al., Desalination 233 (2008), "Fabrication of a high hydrophobic PVDF membrane via nonsolvent induced phase separation", pp. 40-47.
C. Mu et al., Journal of Membrane Science 361 (2010), "Fabrication of microporous membranes by a feasible freeze method", pp. 15-21.
B. Wang et al., Nature Communication, Published Sep. 19, 2016, "Crystal nuclei template nanostructured membranes prepared by solvent crystallization and polymer migration", 8 pgs.
V. Cardoso et al., Soft Materials (2015) 13, "Poly(vinylidene fluoride-trifluoroethylene) Porous Films: Tailoring Microstructure and Physical Properties by Solvent Casting Strategies", pp. 243-253.
B. Li et al., Journal of Membrane Science 517 (2016), "Synthesis of nanoporous PVDF membranes by controllable crystallization for selective proton permeation", pp. 111-120.
Carmen Meringolo et al., "Tailoring PVDF Membranes Surface Topography and Hydrophobicity by a Sustainable Tw-Steps Phase Separation Process", ACS Sustainable Chemistry & Engineering, vol. 6, No. 8, Jun. 4, 2018, p. 10069-10077.
Italian Search Report for Italian Application No. 201800002038, dated Oct. 16, 2018, 9 pgs.
Extended European Search Report dated Jul. 11, 2019.

* cited by examiner

MACROPOROUS POLYVINYLIDENE FLUORIDE (PVDF) MEMBRANES

RELATED APPLICATIONS

This application claims priority to Italian Patent Application No. 10201800003038, filed on Feb. 26, 2018, entitled "New Macroporous Polyvinylidene Fluoride (PVDF) Membranes", the the contents of which are incorporated herein by reference in their entirety.

FIELD

The invention relates to macroporous hydrophobic isotropic polyvinylidene fluoride (PVDF) membranes having improved properties and a method for preparation of the same.

BACKGROUND

In particular the method according to the invention is characterised by the use of dimethyl sulfoxide (DMSO) as a solvent for PVDF, in combination with a vapour induced phase separation (VIPS) stage, for the preparation of macroporous hydrophobic membranes.

The method according to the invention makes it possible to obtain macroporous hydrophobic PVDF membranes having improved characteristics in comparison with the membranes currently available in the art. This method also has the advantage of using a non-toxic solvent to dissolve the PVDF and of requiring very short processing times.

PVDF membranes are used in various applications such as for example filtration or ultrafiltration, in particular of corrosive chemicals, or in biomedical field. High membrane porosity is greatly desired because it allows a high flow velocity for liquids and gases per unit area.

PVDF membranes are generally formed from PVDF dissolved in a solvent; the solutions obtained by dissolving PVDF are poured (cast) as films (moulded films or cast films) in a mould or on a support, then the cast films undergo phase separation to form a porous membrane. Various methods are available for the phase separation stage, such as for example thermally induced phase separation (TIPS), non-solvent induced phase separation (NIPS), vapour induced phase separation (VIPS) or evaporation induced phase separation (EIPS). Different membrane morphologies are obtained depending upon the phase separation method used; for example, isotropic membranes and anisotropic membranes having a porous or dense upper layer may be prepared using the abovementioned methods.

In the VIPS method the cast film is exposed to an atmosphere of a non-solvent vapour which gives rise to phase separation by penetrating the cast film. Using this method PVDF membranes having a porous morphology and having adjustable barrier pore sizes can be obtained in a fast production process that can easily be converted to an industrial scale.

In the preparation of membranes through NIPS or VIPS methods, solvents, such as dimethyl formamide (DMF), dimethyl acetamide (DMAc), N-methyl-2-pyrrolidone (NMP), hexamethyl phosphoramide, tetramethylurea, triethyl phosphate, trimethyl phosphate, acetone and tetrahydrofuran, are generally used to dissolve the polymer. Most of said solvents are toxic according to the GHS classification (Z. Cui et al., Prog. Polym. Sci., 2014). The present invention advantageously uses DMSO as a solvent for PVDF; DMSO is a non-toxic solvent which is not classified as toxic by the GHS.

In the state-of-the-art non-toxic solvents have already been used to prepare membranes (Figoli A. et al. Green Chem., 2014), but not in combination with the VIPS method for forming porous PVDF membranes. For example, the most common use of DMSO as solvent in the preparation of PVDF membranes is in association with a phase of the NIPS type, which has the consequence of forming an anisotropic membrane with pores having a finger-like structure and a dense upper layer (A. Bottino et al., J. Memb. Sci., 1991). Another hydrophilic polymer which results in delayed separation during phase separation and produces more spongy structures with a dense upper layer is very often also added to the solution (D. Lin et al., Eur. Polym. J., 2006; Q. Wang et al., Desalination, 2012), or a mixture of solvent and non-solvent is used as a coagulation bath (D. Lin et al., Eur. Polym. J., 2006; F. Liu et al., J. Memb. Sci., 2011; C. Kuo, et al., Desalination, 2008).

DMSO has also been used as a solvent for PVDF in association with the freezing method, a variant of the TIPS method, in which phase separation is brought about by cooling the cast film below the freezing temperature of DMSO and the frozen DMSO is exchanged with water. This gives rise to the formation of porous membranes having a dense upper layer (C. Mu et al., J. Memb. Sci., 2010; B. Wang et al., Nat. Commun., 2016).

It will be noted that the type of solvent used has a very strong influence on membrane formation. Where a number of polymers and/or solvents associated for example with the NIPS method form a functional membrane, the same group of reagents may not be effective when associated with the VIPS method.

The use of DMSO followed by a stage of the VIPS type for membrane formation is described by Cardoso et al. (V. Cardoso et al. Soft Matter, 2015), in which however a poly(vinylidine fluoride-co-trifluoroethylene) copolymer, comprising PVDF together with trifluoroethylene, is dissolved in DMSO. Also, in the Cardoso method, after the film has been cast, the membranes are exposed to the air for 15 minutes without any control of relative humidity; low porosity membranes with a dense upper and lower layer are thus obtained.

Another example is the work of Li et al. (B. Li et al., J. Memb. Sci., 2016) where polyvinylidene fluoride/sodium allyl sulfonate (PVDF/SAS) in DMSO was used. Again, in this case the authors did not investigate the use of pure PVDF in combination with DMSO as solvent; furthermore, as a method for membrane preparation, Li et al. used the EIPS process in which a cast film is exposed to ambient air for between 30 minutes and 9 hours at 40° C., 60° C. or 80° C. without any control of humidity, followed by immersion in a coagulation bath in water. Membranes having a nodular structure and a dense upper layer are obtained as a consequence.

EP 1839730 cites the possibility of using DMSO to dissolve PVDF, but only in combination with a non-solvent compound, followed by a NIPS stage to form the porous membrane. In addition to this, no working examples showing the characteristics of the membranes obtained after dissolution in DMSO are provided.

The preparation of PVDF membranes by the VIPS method is disclosed by Li et al. (J. Memb. Sci., 2010): in this work a number of solvents (NMP, DMAc and DMF) and their influence on the VIPS process and membrane morphology was studied. The authors did not however examine DMSO as a solvent.

It should be noted that, according to the well-established concept of Hansen solubility parameters (Charles M. Hansen, Hansen solubility parameters: a user's handbook, $2^a$ ed., CRC Press, 2007), a good solvent for PVDF will have a difference of less than one in Hansen solubility parameters. As shown in Table 1 below, the solvents commonly used to dissolve PVDF are DMAc, NMP and DMF, which show differences of up to 2.5 in Hansen solubility parameters. DMSO, with a value of 4.2, is generally considered a poor solvent for PVDF and would not therefore be the first choice of solvent for preparing PVDF membranes.

TABLE 1

| Solvent | Differences in Hansen solubility parameters (solvent-polymer) calculated for PVDF |
| --- | --- |
| DMAc | 1.47 |
| NMP | 2.16 |
| DMF | 2.43 |
| DMSO | 4.20 |

BRIEF SUMMARY

The process according to the invention instead uses DMSO in a surprisingly effective way, obtaining various advantages.

Above all, DMSO is a non-toxic solvent.

Furthermore, by using DMSO as a solvent, the process can be simplified and its efficiency increased through reducing process times, with a consequent reduction in process costs.

At the same time the method according to the invention surprisingly makes it possible to obtain high value products. In fact, the membrane obtained by the process according to the invention demonstrates a variety of improved physical and functional characteristics in comparison with commercially available products.

The generally desired properties for a PVDF membrane are:
a. Spongy structure, giving rise to high porosity and mechanical stability;
b. High porosity, giving rise to a high vapour flow, low thermal conductivity and high surface roughness, with consequent high hydrophobicity;
c. Narrow pore size distribution and high hydrophobicity, giving rise to a high liquid entry pressure (LEP), which in turn makes it possible to have a higher operating pressure on the liquid side in liquid/gas or liquid/liquid membrane contactors;
d. High vapour flow, giving rise to a high water vapour transport rate (WVTR) and overall high membrane performance.

Membranes prepared by the method according to the invention have high hydrophobicity, high porosity, a foam structure, a narrow pore size distribution, high vapour flow and high mechanical stability. In addition to this, in the membranes according to the invention such properties are highly improved in comparison with commercially available products.

The present invention therefore relates to a method for preparing hydrophobic, macroporous and isotropic PVDF membranes comprising: mixing a PVDF polymer with a solvent, obtaining a solution containing PVDF; casting the solution containing PVDF, obtaining a cast film; exposing the cast film to a non-solvent vapour, obtaining a PVDF membrane, and then immersing the membrane in a bath of non-solvent; drying the PVDF membrane; this method being characterised by the fact that said solvent is dimethyl sulfoxide (DMSO).

The present invention also relates to membranes obtained by such method.

Finally, the invention relates to PVDF membranes, which can be obtained using the method according to the invention, and which have new and particularly desirable properties, such as: a pore size distribution range between 0 μm and 0.3 μm or and a water vapour transport rate (WVTR) of greater than 230 $g/m^2/h$.

Preferably, the membranes according to the invention are further characterised by a liquid entry pressure (LEP) of more than 3.5 bar.

The above-mentioned parameters are known and can be measured as described in the art and below.

BRIEF DESCRIPTION OF THE DRAWINGS

Characteristics of the invention are illustrated without limitations and for the purposes of providing examples in the appended figures, in which.

DETAILED DESCRIPTION

Figure 1:
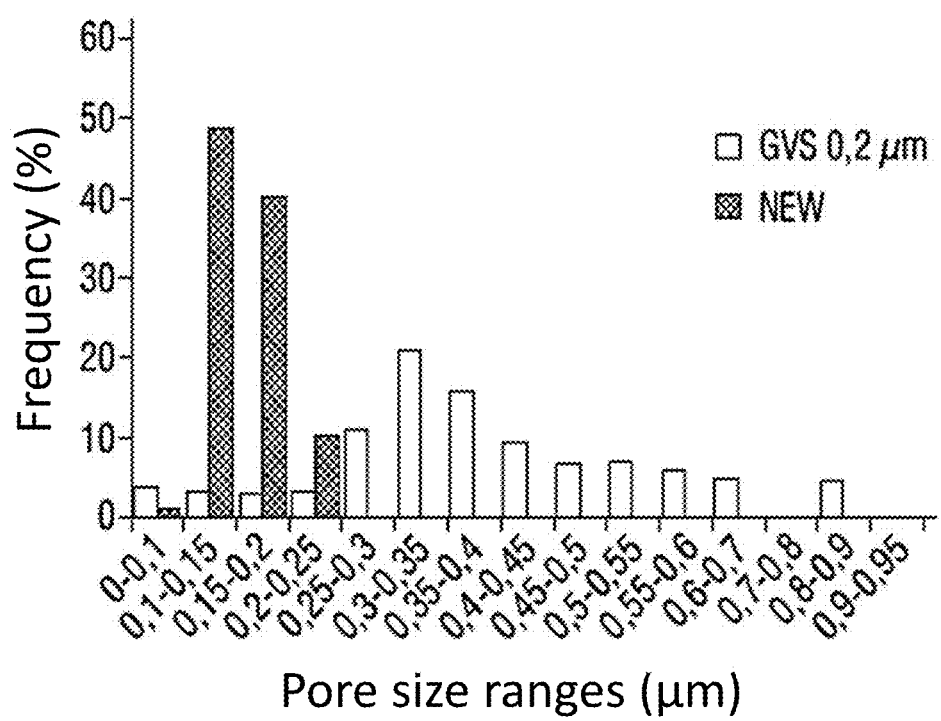
FIG. 1 shows a graph of the pore size distribution of a new membrane (NEW) according to the invention, compared with a commercial membrane (GVS® 0.2 μm)

Further advantages of the invention will be apparent from the following description of preferred embodiments of the invention.

By the term "hydrophobic" membrane is meant a membrane for which the contact angle between a liquid (for example a drop of water) and the surface of the polymer forming the membrane is greater than 90°.

By "macroporous" membrane is meant a membrane having pores of diameter greater than 50 nm (Mulder et al., "Basic Principles of Membrane Technology", Kluwer Academic Publishers, Dordrecht, 2nd Edition, p. 159, 1996; Giorno L et al. (2015) Macroporous, Mesoporous, and Microporous Membranes. In: Drioli E., Giorno L. (eds) Encyclopedia of Membranes. Springer, Berlin, Heidelberg).

By "isotropic" membrane is meant a membrane, whether porous or dense, having a uniform composition and structure; these membranes are distinguished from anisotropic (or asymmetrical) membranes which have different layers, each of which with different structures and permeabilities: for example, a typical anisotropic membrane has a relatively dense thin surface layer supported on an open and very much thicker microporous substrate (Baker et al., "Membrane Technology and Application", Wiley and Sons, 3rd Edition, 2012). Those skilled in the art will therefore be able to distinguish an isotropic membrane from an anisotropic one.

By "dissolution temperature (Td)" is meant the temperature at which the polymer forming the membrane, for example PVDF, dissolves in a solvent, for example DMSO.

A typical process for the preparation of a PVDF membrane comprising the VIPS phase separation stage comprises:

a dissolution stage, in which the polymer is mixed with a solvent under conditions which ensure that the polymer is completely dissolved; at the same time there is substantially no aeration of the polymer solution;

a casting stage, in which the PVDF solution is cast in a mould or onto a substrate, with a defined thickness, thus forming a cast film;

a membrane formation stage, in which a phase separation stage in which the cast film is exposed to air containing the vapour of a non-solvent (VIPS stage), such as for example water vapour, takes place, thus yielding a membrane; the membrane is subsequently immersed in a bath comprising the liquid non-solvent to remove any solvent residues;

a drying stage, in which the membranes are dried, for example in a convection dryer or in an infrared dryer, thus obtaining the final PVDF membrane.

The present invention provides highly hydrophobic, macroporous and isotropic PVDF membranes with functional and adjustable structures through a process combining the use of DMSO as solvent for the polymer with the VIPS method for phase separation of the PVDF film.

The distinctive properties of the membrane can be defined through the functional parameters of the membranes, such as the water vapour transport rate (WVTR) or the liquid entry pressure (LEP) or hydrophobicity, and/or through the structural properties of the membranes, such as porosity or pore size ((2008) Pore Size, Pore Size Distribution, and Roughness at the Membrane Surface. In: Synthetic Polymeric Membranes. Springer Laboratory. Springer, Berlin, Heidelberg).

In particular, the water vapour transport rate (WVTR) describes the ability of a membrane to allow the transport of water vapour across it (expressed in $g/m^2/h$). In the art WVTR is measured using two standard methods described in ASTM E 96-95.1: the dry cup method which requires a drying agent, normally anhydrous calcium chloride, to keep the interior of the plate at a relative humidity (RH) of 0%, and the wet cup method, which is more commonly used, in which distilled water is present in the plate to maintain 100% relative humidity (Hu et al., "Measurement of water vapor transmission rate in highly permeable films", Journal of Applied Polymer Science, 2001; ASTM E 96, Standard Test Methods for Water Vapor Transmission of Materials, 1996).

In the present description a method of measurement comprising the two standard methods mentioned above has been used (the drying agent in this case being an aqueous solution of 40% by weight lithium chloride). In particular, the hydrophobic membrane according to the invention has been attached to a measuring device module and is contacted by the drying solution in transverse flow mode on the active side, while the other side of the membrane is exposed to moist air under constant conditions. After a certain length of time the quantity of water transferred to the other side of the membrane is measured gravimetrically.

Membranes prepared by the method according to the present invention have a WVTR of between 140 $g/m^2/h$ and 260 $g/m^2/h$, preferably the membranes according to the present invention have a WVTR greater than 230 $g/m^2/h$.

The liquid entry pressure (LEP) is the minimum pressure required for a liquid, for example water, to pass through the larger pores of the dry membrane. This parameter is mainly influenced by the wettability of the membranes and the characteristics of the pores. LEP is measured using a simple configuration in which the membrane is fixed with the active side to a tank of water. A constant pressure is applied to the tank of water, and this is increased until penetration of water can be observed on the dry side of the membrane. The pressure measured at that point is the LEP. Methods for measuring LEP are for example described by Hereijgers, et al., "Breakthrough in a flat channel membrane microcontactor", Chemical Engineering Research and Design, p. 100, FIG. 1(b), 2015, as well as by M. Khayet and T, Matsuura "Membrane Distillation Principles and Applications" Elsevier 2011 (Chapter 8—MD Membrane Characterization).

To prevent the membrane from being wetted during use in distillation processes or in gas-liquid contactors, the operating pressure must be below the LEP. Using the method according to the present invention it is possible to prepare membranes having a measured LEP of between 0.5 and 5 bar; preferably the membranes according to the present invention have a LEP greater than 3.5 bar.

The wettability of a membrane depends upon the contact angle between a liquid (for example water) and the surface of the polymer forming the membrane. By definition, hydrophobic surfaces have contact angles of more than 90°. By measuring the contact angle, it is therefore possible to determine the degree of hydrophobicity of a membrane. In the fixed drop measurement method, a drop of water of defined volume is placed on the surface to be tested. Through an optical instrument connected to a computer it is possible to measure the contact angle between the drop and the surface of the membranes. PVDF, as a dense smooth film, itself provides a contact angle of approximately 90°.

The membranes prepared according to the method of the present invention have an open porous surface; this gives rise to high surface roughness which increases the contact angle of the membranes. The membranes according to the invention are in fact highly hydrophobic, having a contact angle of more than 90°, preferably between 100° and 180°, more preferably between 120° and 160°. It will be noted that in the literature a surface having a contact angle of more than 150° is often defined as "superhydrophobic".

The term porosity is understood to be the pore volume divided by the membrane volume (porosity by volume). High porosity is a good precondition for high flow; thus, a dense membrane would have a porosity value of approximately 0%, while the maximum theoretical porosity would be 99.9%. To determine the porosity value, membranes of known dimensions are weighed dry. The membranes are then immersed in a wetting agent (Galwick) with a known density until the pores are completely filled. The impregnated membranes are then removed from the bathing agent and cleaned to remove excess liquid. The membranes are finally weighed wet. Thanks to the difference between the dry and wet weights of the membrane and the known density of the liquid and polymer, it is possible to calculate pore volume. Porosity by volume can therefore be obtained by dividing the pore volume by the volume of the membrane, expressed as a percentage value.

Membranes prepared using the process according to the invention have porosity values by volume of between 60 and 95%. In comparison, commercial PVDF membranes have a porosity within the range 50-77%, depending upon the supplier.

Information on different parameters for measuring pore sizes can be obtained through perm-porometry advanced gas/liquid dewetting of the pores. Pore sizes can in fact be defined "at the bubble point" and "at mean flow" (Dapeng, et al., "Characterization of nanofibrous membranes with capillary flow porometry", Journal of Membrane Science, Elsevier, Volume 286, Issues 1-2., pp. 104-114, 2006; M.

Khayet and T, Matsuura "Membrane Distillation Principles and Applications" Elsevier 2011, Chapter 8—MD Membrane Characterization).

To measure the pore size-relating parameters in the membranes according to the invention the wet-up/dry-down porometric measurement method was used, using a certified Advanced Capillary Flow Porometer (obtained from the company PMI). In this method a membrane of defined area is first immersed in the appropriate wetting liquid and placed under constantly increasing gas pressure. The flow of a volume of gas is measured for each imposed gas pressure. The point at which it is possible to measure a flow of gas indicates that the pressure is sufficiently high to expel liquid from the largest pore (bubble point pressure); this pressure is used to define the maximum pore size, known as "at the bubble point". With a further increase in pressure, liquid is also expelled from smaller pores and the flow rate increases until all the pores are empty.

In the second part of the characterisation the gas flow as a function of pressure is measured in the dry membrane. The point at which the flow rate through the wet sample is the same as that through the dry sample is the minimum pore size. The mean pore size "at mean flow rate" is determined at 50% of the "wet flow" (during wet-up measurement) in comparison with the flow of gas through the dry membrane at the same pressure (dry-down).

Membranes prepared using the method according to the present invention display pore sizes, at mean flow, of between 0.1 µm and 1.2 µm. The pore size at the bubble point lies between 0.2 µm and approximately 3 µm.

By comparing the dry flow with the wet flow for each pressure (corresponding to a particular specific porosity according to the Laplace equation) it is possible to obtain the pore size distribution.

The membranes according to the invention are characterised by a narrow pore size distribution, said pore size distribution being in the range of from 0 µm to 0.3 µm, preferably in a narrower range, more preferably in the range from 0 µm to 0.25 µm. FIG. 1 shows by way of example and without any limitation the pore size distribution of a membrane prepared according to the present invention (NEW) and of a membrane according to the art (GVS 0.2 µm). A pore size distribution in the interval from 0 to 0.3 µm means that the difference between the maximum pore size and the minimum pore size is below or equal to 0.3 µm.

The flow of air is also measured during the porometric measurement. This is reflected in values which, separately from the pore size, provide information on the gas permeability of the membrane. The flow of air in the membranes obtained using the method according to the invention lies between 0.8 and 15 l/(min·cm²·bar).

Cast membranes according to the method of the present invention preferably have a thickness within the range from 60 to 200 µm, more preferably between 80 and 160 µm, even more preferably of about 100 µm.

Figure 2:
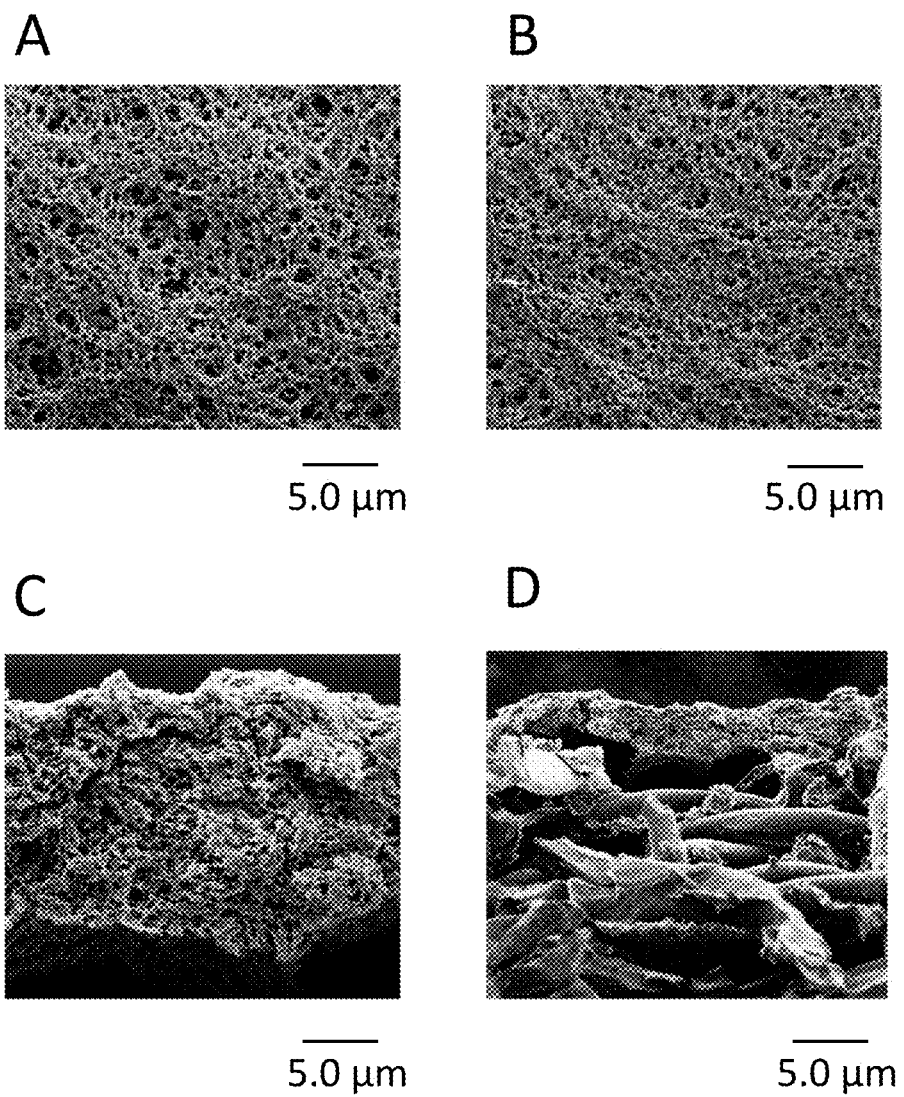
FIG. 2 shows scanning microscope (SEM) images of new supported membranes according to the invention: (A) top view, (B) bottom view, (C) transverse cross-section close to the selective layer, (D) transverse cross-section including the supporting layer.

A direct view of the morphological structure of the membranes can be obtained through scanning electron microscopy (SEM). The membranes according to the present invention have been examined in transverse cross-section and at upper and lower surfaces, as shown in FIG. 2. The lower surface is the side facing the casting support while the upper surface is the opposite side. The transverse cross-section was obtained by breaking the sample in liquid nitrogen. In this way the fine structure of the membrane can be observed and it is not adversely affected by cutting.

Membranes having two-dimensional, nodular and open structures were observed in the present invention.

PVDF is a semi-crystalline structure, in that ordered domains coexist together with amorphous regions within the polymer. The crystallinity fraction can be measured using differential scanning calorimetry (DSC): using this method the difference in the quantity of heat needed to increase the temperature of a sample in comparison with a reference sample is measured. Phenomena such as crystallisation provide a characteristic model of a sample's heat consumption. The crystalline form fraction can be obtained through mathematical analysis of the results and using calorimetric data for purely crystalline reference materials. In the membranes according to the present invention the quantity of crystalline forms is between 50 and 65%, more preferably between 55 and 60%.

Each stage in the process for preparing PVDF membranes is characterised by various parameters that can be controlled in order to obtain different structures. On the basis of the knowledge of the art and thanks to the present description those skilled in the art will be able to adjust such variable parameters within the process according to the present invention to obtain functional PVDF membranes according to the invention, having particularly preferred unique structures, without adding additives.

In general, the process according to the present invention makes it possible to use a range of PVDF of different molecular weight, in different concentrations, with a variety of temperatures and dissolution times for PVDF in DMSO, different film thicknesses, different relative humidities and exposure times during the VIPS stage. In addition to this, depending upon the ultimate application, the membrane can be produced as an unsupported or self-supporting material, or one supported on a non-woven fabric.

The following description indicates the preferred parameters for the method according to the present invention through which PVDF membranes having improved properties can be obtained.

In the method according to the present invention the PVDF polymer may be a PVDF having a low, high or very high molecular weight. For example, PVDF may have molecular weights of between 300 and 600 kDa, more preferably between 300 and 320 kDa (low molecular weight, LMW), or between 570 and 600 kDa (very high molecular weight, VHMW).

During the stage of PVDF dissolution according to the method of the present invention, the PVDF is mixed with DMSO, in the absence of further polymers or copolymers and in the absence of further solvents or non-solvent compounds. Preferably a dissolution mixture consisting of PVDF and DMSO is prepared.

The PVDF is present in the dissolution mixture in a concentration of preferably between 8% and 17% by weight of the total weight of the dissolution mixture (w/w), more preferably between 12% and 15% (w/w), even more preferably of about 15% (w/w).

During the dissolution stage, PVDF is dissolved in DMSO at a Td which is preferably of 40° C. or more, for example a Td of between 40° and 100° C., more preferably of between 40° C. and 60° C., even more preferably of about 50° C.

Preferably the dissolution time for the PVDF polymer in the process according to the present invention is between 1 hour and 24 hours. This preferred parameter of the process is not to be understood to be limiting, because those skilled in the art are capable of establishing when the polymer is completely dissolved and to continue the dissolution stage for sufficient time for complete dissolution of the PVDF. For example, for dissolution temperatures of about 50° C., the minimum time for the dissolution of PVDF in DMSO is approximately 2 hours; preferably the dissolution time does not exceed 24 hours.

During the membrane formation stage according to the method of the present invention, the non-solvent (vapour and/or liquid) is preferably water, more preferably osmotic deionised water.

The temperature of the non-solvent vapour and/or liquid is preferably between 20 and 36° C., more preferably said temperature is ambient temperature (that is, as known, 25° C. under standard pressure conditions).

The time for exposure to the non-solvent vapour is preferably of between 1 minute and 10 minutes, more preferably below or equal to 6 minutes, even more preferably of about 1 minute.

In addition to this, during the stage in which the film is exposed to non-solvent vapour the relative humidity (RH) is preferably within the range 50-90%, more preferably of about 60% or more, even more preferably of about 80% or more.

During the casting stage of the method according to the present invention a casting temperature for the PVDF solution of between 20° C. and 50° C. is preferably used. The rate of casting is preferably within the range between 0.2 and 1.2 m/min, more preferably of about 0.4 m/min.

In addition to this, self-supported membranes or membranes supported on different types of supports may be prepared. The support on which the PVDF solution is cast may for example be a mould or a sheet of glass for self-supporting membranes or a non-woven fabric for supported membranes.

The step of immersion in the non-solvent coagulation bath during the stage of forming the membrane according to the invention, is to remove any residues of solvent remaining after the VIPS stage. Those skilled in the art will be able to establish suitable conditions for performing this step; preferably, in the present method such conditions comprise the use of water as non-solvent and ambient temperature for the non-solvent bath. This is made possible through the use of DMSO as solvent and short exposure times to non-solvent vapour during the VIPS stage.

In the method according to the present invention the membranes are preferably dried at about 100° C. for a time of preferably between 2 and 6 minutes. It will be noted however that the method according to the invention may also provide for different drying times and temperatures.

EXAMPLES

The method according to the present invention provides membranes with improved performance in comparison with commercially available products. Some examples of the preparation of membranes in accordance with particularly preferred embodiments of the present invention will be described in the paragraphs below.

Example 1

The membrane according to the invention was here prepared in a semi-continuous pilot plant using low molecular weight PVDF (300-320 kDa), dissolved to 15% (w/w) in DMSO at a Td=50° C. The membrane was cast onto a support in a thickness of 150 μm at a rate of 0.4 m/min and exposed to non-solvent vapour under relative humidity conditions of approximately 80%.

Detailed data on the size of the pores in the membrane prepared in this way (membrane according to the invention) are shown in Table 2; LEP and air flow in Table 3.

Parameters corresponding to a commercial PVDF membrane (GVS® 0.2 μm) prepared as described in EP 1839730 are shown as a comparison.

TABLE 2

| Membrane | Mean pore size at the flow rate [μm] | Mean pore size at the bubble point [μm] |
| --- | --- | --- |
| GVS ® 0.2 μm | 0.36 | 0.90 |
| Membrane according to the invention | 0.14 | 0.22 |

TABLE 3

| Membrane | Air flow [l/min · cm² · bar] | LEP [bar] |
| --- | --- | --- |
| GVS ® 0.2 μm | 5.0 | 2.6 |
| Membrane according to the invention | 1.6 | 4.8 |

Example 1 shows that the method according to the invention provides membranes with improved properties in comparison with commercially available products.

Example 2

Here the membrane according to the invention was prepared using low molecular weight PVDF (LMW, 300-320 kDa), dissolved to 15% (w/w) in DMSO and at a Td=50° C. The membrane was cast onto a glass sheet in a thickness of 200 μm, exposed to the non-solvent vapour for approximately 2 minutes, with approximately 80% relative humidity.

Without any post-treatment, the method according to the invention made it possible to obtain membranes having greater porosity and a higher contact angle for water than commercial products, as shown in Table 4.

Corresponding parameters for a commercial PVDF membrane (GVS® 0.2 μm) prepared as described in Example 1 and post-treated with hydrophobic post-treatment as described in EP 1839730 A1 are shown as a comparison.

TABLE 4

| Membrane | Initial water contact angle [°] | Porosity [%] |
| --- | --- | --- |
| Post-treated GVS ® 0.2 μm | 163 | 55 |
| Membrane according to the invention | 169 | 87 |

Example 3

Here the membrane according to the invention was prepared using very high molecular weight PVDF (VHMW, 570-600 kDa) dissolved to 15% (w/w) in DMSO at a Td=50° C. The solution was cast on a glass sheet in a thickness of 100 μm, then the film was exposed to non-solvent vapour for approximately 2 minutes, with approximately 80% relative humidity. The characteristics of the membrane obtained are shown in Table 5.

Parameters corresponding to a commercial PVDF membrane (GVS® 0.2 μm) prepared and post-treated as described in Example 2 are shown as a comparison.

TABLE 5

| Membrane | Water vapour transport [g/h/m$^2$] | ±uncertainty in the mean |
|---|---|---|
| Post-treated GVS ® 0.2 μm | 216 | ±10 |
| Membrane according to the invention | 256 | ±6 |

The invention makes it possible to obtain membranes having a higher water vapour transport rate compared to commercial products.

Example 4

Here the membrane according to the invention was prepared by dissolving low molecular weight PVDF (LMW, 300-320 kDa) to 15% (w/w) in DMSO at a Td=50° C. The membrane was cast onto a glass sheet in a thickness of 100 μm, at a rate of 0.4 m/min, and was exposed to non-solvent vapour in atmosphere at approximately 80% relative humidity. Table 6 shows the characteristics of the membrane so obtained (membrane according to the invention) compared with those of commercial membranes (GVS® 0.2 μm) prepared as described in Example 1.

TABLE 6

| Solvent | Mean pore size at the flow rate [μm] | Mean pore size at the bubble point [μm] | Water vapour transport rate [g/m2/h] ± uncertainty in the mean | Liquid entry pressure [bar] ± uncertainty in the mean |
|---|---|---|---|---|
| DMSO | 0.16 | 0.26 | 243 ± 10 | 3.6 ± 0.1 |
| GVS ® 0.2 μm | 0.36 | 0.90 | 216 ± 10 | 2.6 ± 0.1 |

The membrane here prepared according to the invention shows a porosity greater than 60%, while the commercial membrane has a porosity of about 55%.

In addition to this, the membrane according to the invention of the present example manifested a very much narrower pore size distribution, within the range of from 0 μm to 0.3 μm, in comparison with the commercial membrane, and a water vapour transport rate of over 230 g/m$^2$/h. See FIG. 1, showing the distribution of the pore sizes in said membrane according to the invention and in said commercial membrane (the pore sizes on the x axis are grouped in sub-ranges, e.g. from 0 to 0.1 μm, from 0.1 to 0.15 μm).

The method according to the present invention differs from conventional methods for the preparation of PVDF membranes in the use of non-toxic components, without the need for additives, thus minimising organic solvent residues. The characteristics of the product obtained are better than those of commercially available membranes. In particular, the membranes are characterised by greater porosity, a higher contact angle for water and a greater WVTR compared to available membranes having the same nominal pore size. Thanks to the invention it is possible to obtain membranes having a very narrow pore size distribution. At the same time, the processing time during the VIPS stage is kept reasonably short, thus making it possible to transfer the PVDF membrane production to industrial scale.

What is claimed is:

1. A method for preparing a macroporous, hydrophobic and isotropic polyvinylidene fluoride (PVDF) membrane comprising in sequence:
   (i) a dissolution stage comprising mixing PVDF in a solvent for sufficient time to dissolve the PVDF polymer, obtaining a solution containing PVDF;
   (ii) a casting stage comprising casting the solution containing PVDF from stage (i), obtaining a film;
   (iii) a membrane-formation stage comprising exposing the film from stage (ii) to a non-solvent vapour, obtaining a PVDF membrane that is macroporous, hydrophobic, and isotropic, and subsequently immersing the membrane in a bath of non-solvent under suitable conditions for removing the residual solvent from the membrane; and
   (iv) a drying stage comprising drying the PVDF membrane from stage (iii);
   wherein the method is characterised by said solvent in stage (i) being dimethyl sulfoxide (DMSO).

2. The method according to claim 1, wherein in stage (iii) the film is exposed to non-solvent vapour under conditions of relative humidity (RH) of about 40% or more.

3. The method according to claim 1, wherein said dissolution stage (i) takes place at a temperature of about 40° C. or more.

4. The method according to claim 1, wherein in said membrane-formation stage (iii) the film is exposed to non-solvent vapour for a time of about 6 minutes or less.

5. The method according to claim 1, wherein during said membrane formation stage (iii) the temperature of the non-solvent bath is room temperature.

6. The method according to claim 1, wherein the non-solvent is water.

7. The method according to claim 1, wherein in said membrane-formation stage (iii) the film is exposed to non-solvent vapour under conditions of relative humidity (RH) of about 60% or more.

8. The method according to claim 1, wherein in said membrane-formation stage (iii) the film is exposed to non-solvent vapour under conditions of relative humidity (RH) of about 80% or more.

9. The method according to claim 1, wherein in said membrane-formation stage (iii) the film is exposed to non-solvent vapour for a time of about 1 minute.

* * * * *